United States Patent [19]
Bustos et al.

[11] Patent Number: 5,918,764
[45] Date of Patent: Jul. 6, 1999

[54] PNEUMATIC PRODUCT VENDING SYSTEM AND PRODUCT LOADER THEREFOR

[75] Inventors: Rafael T. Bustos, Alpharetta; William S. Spamer, Roswell, both of Ga.

[73] Assignee: L&P Property Management Company, South Gate, Calif.

[21] Appl. No.: 08/901,091

[22] Filed: Jul. 28, 1997

Related U.S. Application Data

[63] Continuation-in-part of application No. 08/571,252, Dec. 12, 1995, Pat. No. 5,816,443, and a continuation-in-part of application No. 08/571,253, Dec. 12, 1995, Pat. No. 5,725,124, each is a continuation-in-part of application No.08/449,935, May 25, 1995, Pat. No. 5,586,686, which is a continuation-in-part of application No. 08/404,243, Mar. 15, 1995, abandoned.

[51] Int. Cl.⁶ .................................................. B23Q 7/04
[52] U.S. Cl. ............................ 221/211; 186/55; 406/2
[58] Field of Search .............................. 221/150 R, 211, 221/278; 186/52, 55, 56, 58; 406/3, 1, 2

[56] References Cited

U.S. PATENT DOCUMENTS

| | | | |
|---|---|---|---|
| 3,647,026 | 3/1972 | Alexander et al. | 186/1 C |
| 3,877,241 | 4/1975 | Wade | 62/137 |
| 3,951,461 | 4/1976 | De Feudis | 302/27 |
| 4,073,368 | 2/1978 | Mustapick | 186/1 C |
| 4,111,282 | 9/1978 | Vayda, Jr. | 186/1 C |
| 4,284,370 | 8/1981 | Danier et al. | 406/86 |
| 4,638,312 | 1/1987 | Quinn et al. | 340/825.35 |
| 4,675,515 | 6/1987 | Lucero | 235/381 |
| 4,712,650 | 12/1987 | Campbell | 186/41 |
| 5,020,688 | 6/1991 | Power | 221/150 A |
| 5,105,979 | 4/1992 | Bakx et al. | 221/150 HC |
| 5,158,155 | 10/1992 | Domain et al. | 186/53 |
| 5,354,152 | 10/1994 | Reinhardt et al. | 406/3 |

FOREIGN PATENT DOCUMENTS

| | | |
|---|---|---|
| 509125 | 9/1930 | Germany . |
| 2514442 | 10/1976 | Germany . |
| 56-3229 | 1/1981 | Japan . |
| 2202694 | 8/1990 | Japan . |
| 1373088 | 11/1974 | United Kingdom . |

*Primary Examiner*—Kenneth Noland
*Attorney, Agent, or Firm*—Wood, Herron & Evans, L.L.P.

[57] ABSTRACT

An existing product vending machine, such as a refrigerated vending machine provided by a bottled soft drink manufacturer or distributer, is adapted to serve as a storage and loading device for use in a pneumatic vending and delivery system by installing an interface unit in place of the vending machine door. The interface unit may be configured to mount on hinges or other pre-existing panel supporting structure of the vending machine and to lock to pre-existing latching structure on the vending machine. Alternatively, the dispensing mechanism and product storage supply from one or more product vending machines may be installed in a vault and equipped with one or more of the interfaces. The interface is provided with a loading tube that connects to the upstream end of the tube of a pneumatic conveyor of the vending and delivery system. A loading port at the lower end of the loading tube, which may have a pivotal closure that serves as a landing pad to catch and load a dispensed product into and to close the port, preferably with the product base, e.g. the bottom of a soft drink bottle, facing forward in the tube. A blower at the base of the loading tube blows the product through the tube when a product is loaded. The interface includes wiring that interconnects the system controller with the dispensing mechanism so bottles are selectively loaded as selected at the vending system entry panel. The interface is preferably insulated on the inside wall thereof with the loading tube and blower lying on the outside of the refrigerated volume.

19 Claims, 5 Drawing Sheets

5,918,764

PNEUMATIC PRODUCT VENDING SYSTEM AND PRODUCT LOADER THEREFOR

This is a continuation-in-part of U.S. patent applications Ser. Nos. 08/571,252 now U.S. Pat. No. 5,816,443, entitled Product Vending System With Pneumatic Product Delivery and 08/571,253 now U.S. Pat. No. 5,725,124 Product Vending And Pneumatic Delivery System And Method, both filed Dec. 12, 1995 and both continuations in part of U.S. patent application Ser. No. 08/449,935, filed May 25, 1995, entitled "Temperature Maintained Food Dispensing System and Method, now U.S. Pat. No. 5,586,686, which is a continuation-in-part of U.S. patent application Ser. No. 08/404,243, filed Mar. 15, 1995, now abandoned, entitled "Temperature Maintained Beverage Dispensing System and Method", all of which are hereby expressly incorporated by reference herein.

FIELD OF INVENTION

This invention relates to the vending, delivery and dispensing of individually packaged products such as beverages or other items of food, and, more particularly, to the delivery and dispensing of food and other vended products, and to construction and control of product vending systems.

BACKGROUND OF THE INVENTION

Much of the merchandising of food and beverages and the vending of a large number of other retail products occurs in circumstances that are ancillary to some other marketing activity by which other products and services are sold. That other activity is the primary attraction that brings the customer onto the business premises of the merchant or causes the customer to enter into a business relationship with the merchant. On the occasions of the presence on such business premises, such guests or customers often have a demand for other products, such as food or beverage products, and become potential customers for the merchandising of such other products.

Applicant has, in the parent applications referred to above, provided systems and methods that fill various needs that have existed in the vending of products, particularly beverages and other packaged food products, to customers of preexisting enterprises. Applicant's system has provided for the automatic pneumatic transfer of vended products from a remote storage location to a vending terminal at which a customer may enter a selection through a control panel. Applicant's system and method are particularly effective for the vending of beverages in their own plastic bottles by blowing air directly against the bottles to move them through a tube. Applicant's system and method provides for the charging or accounting for the purchase by utilizing the charge and payment capabilities of a diverse vending system, such as a gasoline dispensing and vending system, to which applicant's system is connected.

In the course of implementing applicant's pneumatic vending system, the need arises for automatically loading products of various types into the pneumatic delivery system, particularly where different potential products may be diverse in shape and require different handling and storage requirements. Custom adaptation of a pneumatic vending system to various products is undesirable, particularly because it increases the cost of installation of the system and limits flexibility of use of the system for changing product requirements.

Accordingly, there remains a need in the retailing industry, particularly for the sale of cooled beverages, or other temperature-maintained, cooled or heated food items at locations such as gas stations, for selectively loading such products into a product delivery system.

SUMMARY OF THE INVENTION

A primary objective of the present invention is to provide a method and system for merchandising products to customers in situations and at locations where it has previously been inconvenient or expensive to do so, particularly where it is difficult or impractical to store the products at the point of sale without undue human labor to sell and deliver the product into the hands of the customer.

A particular objective of the present invention is to provide a vending system that will automatically load, deliver and dispense or otherwise present products to customers and to allow the customer the ability to select products and order their purchases, and to automatically load and deliver a selected product to the customer, without the intervention or assistance of a sales or product delivery person. A more particular objective of the present invention is to provide a system in which products can be stored at a convenient storage location and automatically dispensed to a customer without the need to specially manufacture a complete custom system to store, handle, load and dispense each specific manufacturers' or suppliers' products.

Another objective of the present invention is to provide a vending system with the ability to automatically load and convey selected products in their own packages to customers without the need for the product to be carried to the customer by a delivery person or by the movement of a reusable mechanical carrier as part of the delivery system. A further objective of the present invention is to provide a system and method for delivering purchased products to customers, and particularly for delivering and dispensing temperature maintained food products, and particularly beverage, in their own non-reusable individual packages or packaging containers.

It is a further objective of the present invention to provide a system and method capable of unattended delivery of vended products particularly selected beverages or other packaged food products, for immediate consumption may be carried out using pre-existing dispensing equipment to load the system, or using equipment provided for the dispensing of particular products of a particular supplier or manufacturer.

Another objective of the present invention is to provide an auxiliary product vending system that is controlled through an interaction with the vending system control or the control of a diverse product or service providing system or payment accounting system.

According to the principles of the present invention, there is provided a method and system by which individually packaged products, including beverages, such as soft drinks, are dispensed. The system and method use features of the pneumatic vending system are described in the patents and applications incorporated by reference above. The system employs, as a loading mechanism therefor, a dispensing apparatus particularly suited for the products of a particular type or source, and preferably employs a product dispensing apparatus of a pre-existing type that dispenses the particular products of the supplier or manufacturer that are being dispensed by the system.

In accordance with the preferred embodiment of the invention, there is provided a method and apparatus for adapting the loading end of the pneumatic product delivery system, at the product storage location, which transports the product from the storage location to a dispensing location, that is connectable to a loading device suitable for the product, and preferably, in the case of bottled beverages particularly, in the form of a vending machine supplied by the supplier of the product.

One preferred embodiment of the invention is a pneumatic delivery system of a type similar to that described U.S. Pat. No. 5,586,686 which has been incorporated by reference, with the loading mechanism thereof in the form of a soft drink vending machine provided by the distributor of the soft drinks being dispensed by the pneumatic delivery system, modified and adapted for incorporation into a system of the present invention. For the modification of a product vending machine to a form that will enable it to serve as a loading mechanism of the system, the system is provided with a mechanical and control interface which replaces the standard door of the soft drink vending machine. The interface includes a landing pad adapted to receive a selected bottled soft drink or other product, for example, which is dropped onto the pad from a refrigerated rack in response to a command signal. The command signal is a signal generated through the pneumatic delivery system selector, and replaces signals that would otherwise be generated by a selector provided on the vending machine door that has been removed and replaced with the interface. The pad directs the dispensed selected product into the loading end of the pneumatic tube of the pneumatic delivery system. A blower or pump that is provided in the interface unit blows air behind the loaded product to move the product into and through the tube of the system to pneumatically transport the product to the dispensing location. At the dispensing location, the product may be carefully decelerated to a stop and either automatically removed or presented to the customer for manual removal, all in accordance with features of the patent applications identified above and incorporated by reference herein.

In accordance with an alternative embodiment of the invention, the interior mechanical portions of a one or more vending machines of one or more manufacturers or distributers are disposed in a storage vault such as a resupplier accessible refrigerated vault outside of a vending facility, and adapted with interfaces to selectively operate the controls of such mechanical portions and to load products therefrom into the pneumatic tubes of pneumatic conveyor systems.

The invention particularly provides a method of adapting existing vending machines, or at least the mechanical interior portions thereof, of a product supplier, such as refrigerated beverage vending machines of the type provided by soft drink suppliers, to a pneumatic delivery system. The method includes the providing of an interface unit which replaces the standard or existing vending machine door. The interface includes a coupling for directing a dispensed bottled beverage into an opening in a loading end of a tube of a pneumatic conveyor that originates in the interface unit. The interface unit preferably includes connectors for feeding control lines from the pneumatic delivery system through to the control lines of the vending machine so that the control of the pneumatic system can replace the original controls of the vending machine that are typically included in the door which is being replaced. Preferably also, the interface includes a blower for moving the loaded bottled beverage through the tube and includes insulation, preferably in the wall that is toward and covering the door opening of the vending machine so that the refrigerated atmosphere within the vending machine does not escape to the area that contains the tube loading port and blower.

According to certain features of the preferred embodiment of the invention, the interface is preferably configurable or is one of a set of different configurations, each of which enables the system to be connected to a different loading device, such as a vending machine of a different one of several product suppliers.

The advantages of the present invention include the ability of a vendor to adapt the vending system to accommodate different products and to change the selection of products by altering the interface or its configuration and the vending device connected thereto.

These and other objectives and advantages of the present invention will be more readily apparent from the following detailed description of the drawings of the preferred embodiment of the invention, in which:

DETAILED DESCRIPTION OF THE DRAWINGS

Figure 1:
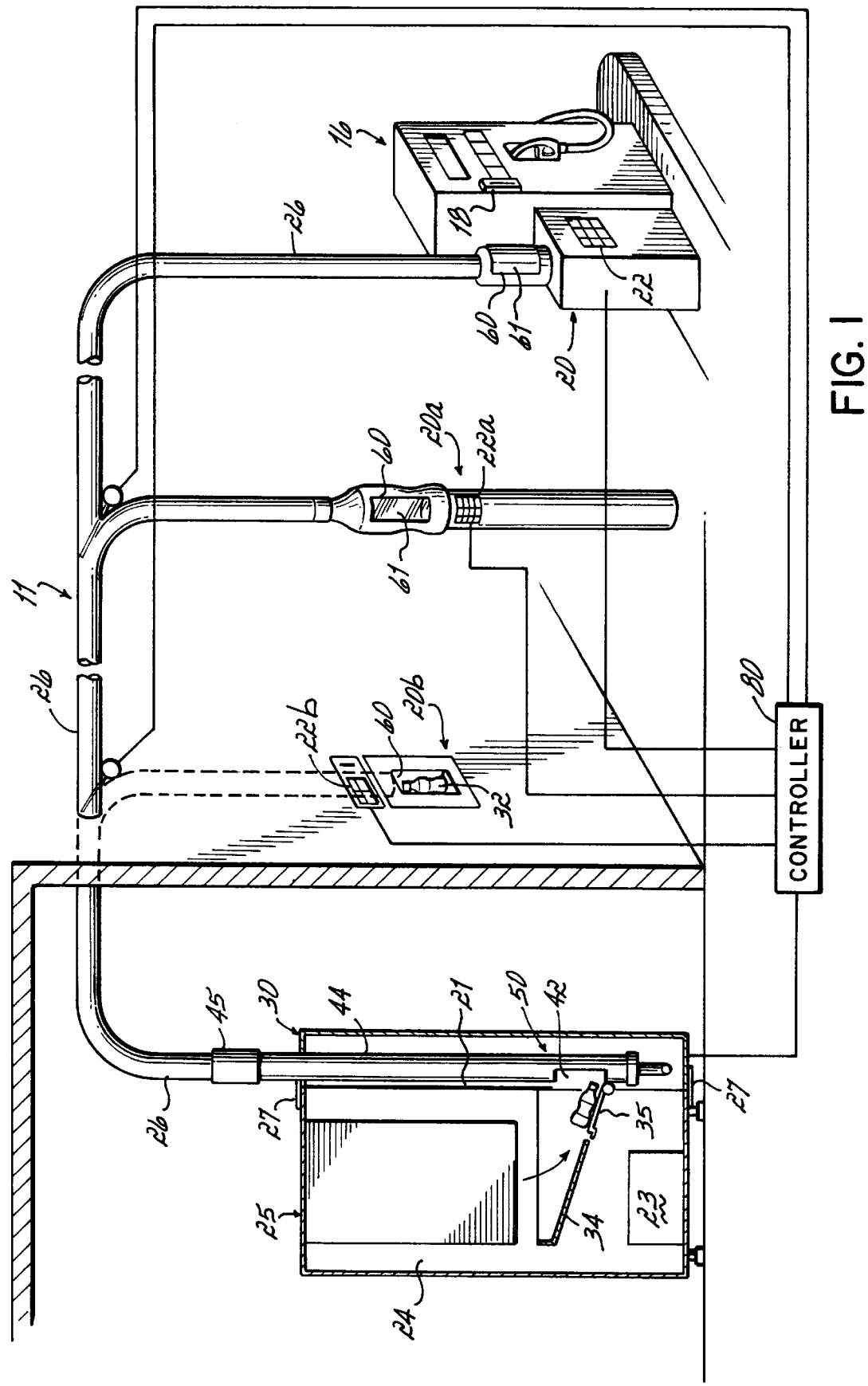
FIG. 1 is a perspective view of one preferred embodiment of a system according to principles of the present invention.

FIG. 1 illustrates one preferred embodiment of the invention in the form of an automated retail or vending system 10 that includes a product vending system in the form of an automated pneumatic food or beverage delivery and dispensing system 11 in combination, for example, with a diverse product providing system in the form of a self-service gasoline dispensing facility. One embodiment of such a system 10 in the form of a gasoline dispensing system is more particularly described in the patent applications incorporated by reference and identified above. In such a system 10, a pump island 16, which may be provided with credit card reader 18, is also linked to a product selector that is electrically interconnected with a dispensing unit 20 of a customer terminal of the product dispensing system 11. In addition or in the alternative to card reader 18, a cash dispenser or a customer identifying device may be provided. The dispensing unit 20 is provided with an order entry panel 22, which includes a product selector by which the customer makes a selection of and purchases a product such as a beverage. Alternatively or in addition, other types of dispensing units, such as units 20a and 20b, may be provided, which may also include product selectors 22a,22b, respectively.

The units 20a,20b, hereinafter referred to only as units 20, are preferably connected to some device, circuitry or other transmission or communication link that is in communication with the card reader 18 or the billing system of diverse vending system at the facility, such as that of the charge system of a gasoline vending system. The dispensing unit 20 is typically located either in an indoor room temperature environment or at an outdoor location, neither of which is customarily maintained at a temperature ideal for the storage of the product being dispensed.

Figure 2:
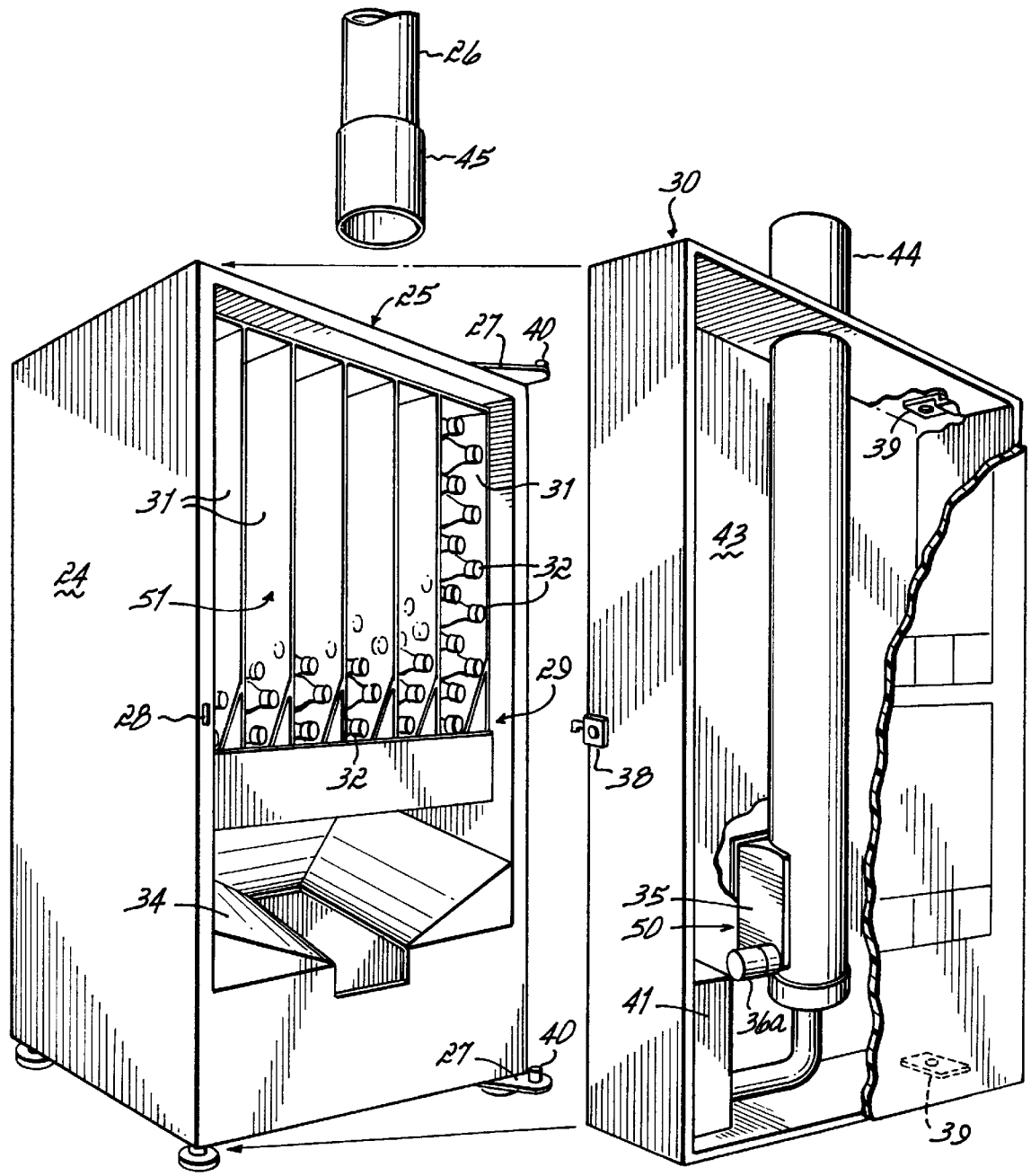
FIG. 2 is a perspective view of one embodiment of a loading station of the system of FIG. 1.

In the illustrated embodiment of FIG. 1, the beverage dispensing system 11 is provided with a temperature controlled storage vault 25 that may be enclosed within store facility 15, for example, or placed in an outdoor environment. The vault 25 is connected to the input end of a pneumatic tube 26 of the pneumatic vending system 11. The tube 26 preferably has a generally circular cross-section and has one or more output ends connected to the dispensing units 20. The vault 25 may be in the form of the main insulated storage cabinet or compartment 24 of a refrigerated vending machine, which has a refrigeration unit 23 that is a part thereof, with the standard door of the vending machine removed exposing an open vending machine front 21, but leaving the standard door hinges 27 and latch mechanism 28, as better illustrated in FIG. 2. In such a form, the standard vending machine door is replaced with pneumatic delivery system door interface unit 30 that pivotally connects to the standard door hinges 27 of the storage cabinet 24. The interface unit 30 pivots on the hinges 27 between an open position, for the refilling of the vault 25 with beverages or other such products, and a closed position in which it closes and seals the open machine front 21, being locked in the closed position by the latch mechanism 28 on the cabinet 24.

Figure 3:
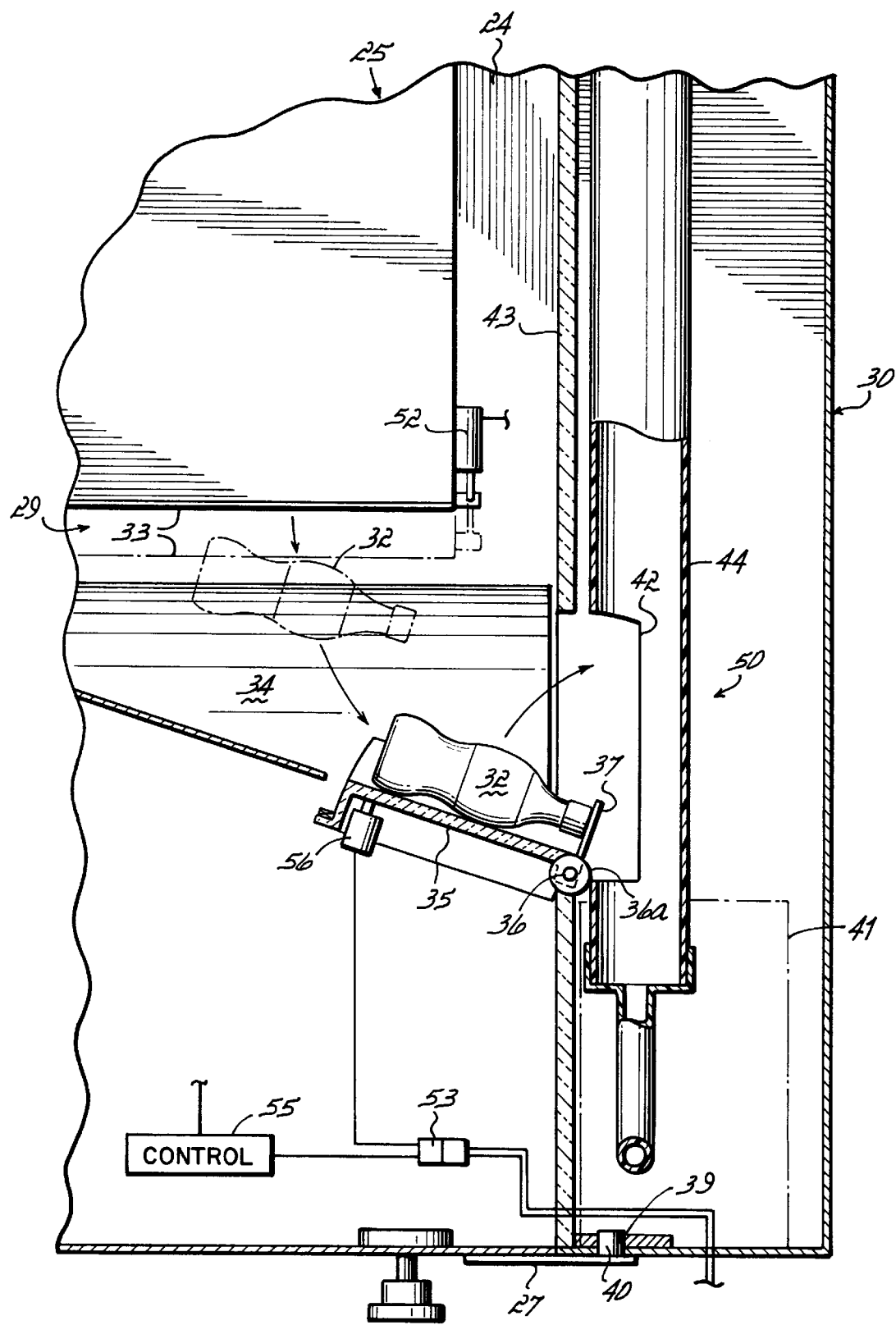
FIG. 3 is a cross-sectional view along line 3—3 of FIG. 2, illustrating a beverage product being loaded by the loading portion of the system from a vending machine and positioned to be loaded into the loading end of a conveyor tube of the system of FIG. 1.
Figure 4:
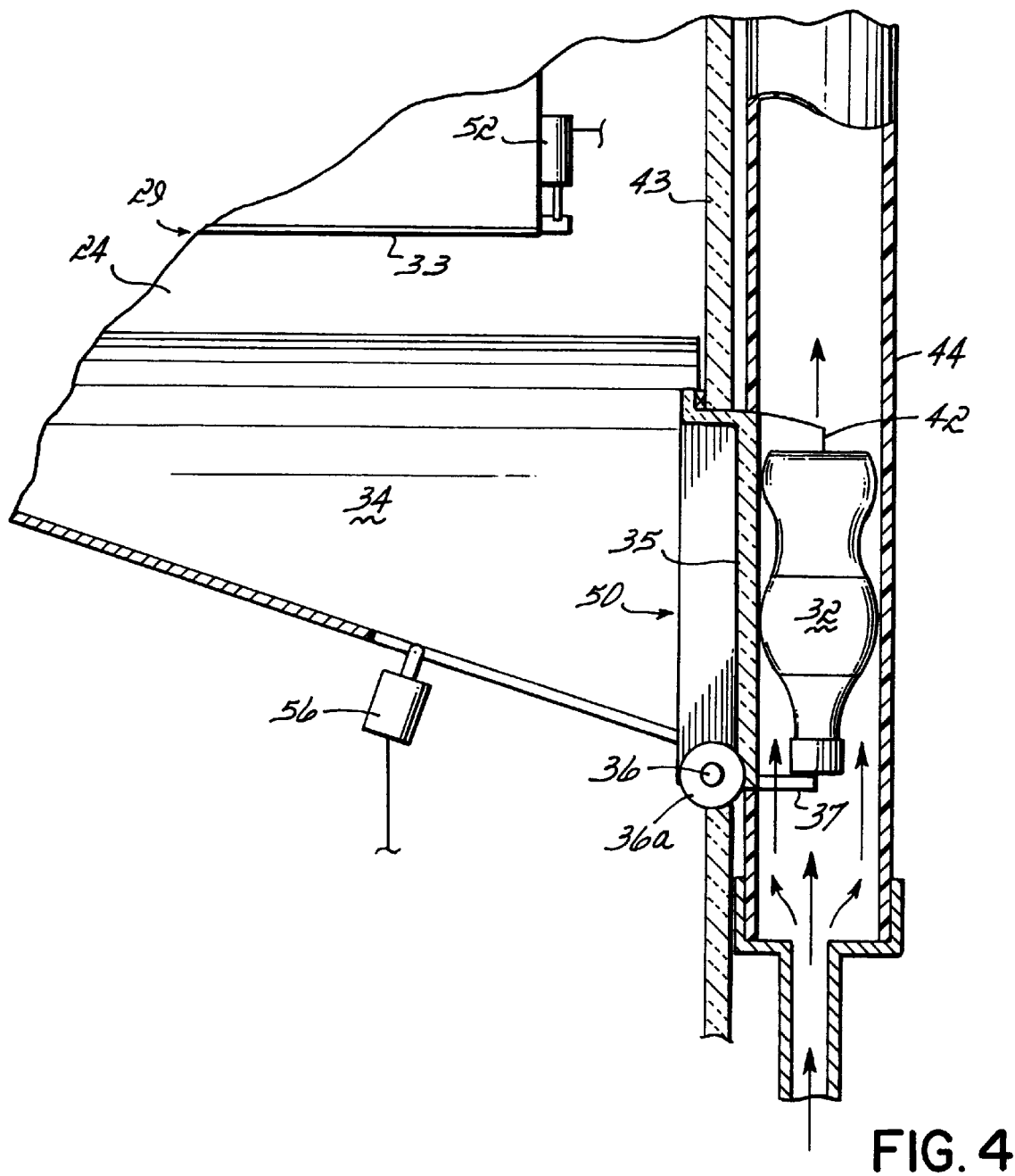
FIG. 4 is a cross-sectional view, similar to FIG. 3, illustrating the loading of a beverage in its packaging container into a pneumatic tube so that the packaging container forms the carrier.

The vending machine main cabinet 24 contains a dispensing mechanism 29, which, in combination with the interface unit 30 provides a loading mechanism 50 for the pneumatic delivery system 11. The dispensing mechanism 29 typically includes a product supply 51 and devices for dispensing packaged products from the product supply 51. The product supply 51 is preferably divided into a plurality of bins 31, each of which holds a separate supply of one of a plurality of different kinds of packaged products such as beverages 32, preferably each in its own disposable can or plastic bottle. At each of the bins 31 the dispensing mechanism 29 typically includes a selectively operable discharge device or element such as a solenoid operated trapdoor 33 positioned below the bin, as illustrated in FIG. 3. Each trapdoor 33 of a typical beverage vending machine is, for example, provided with a solenoid controlled actuator 52 and is configured to open momentarily in response to a signal from a controller. With the system 10, a signal from a product selector on the order entry panel 22 causes the appropriate door 33 to open, which causes the selected beverage from the corresponding bin 31 to drop onto a tapered chute 34 at the bottom of the compartment 24.

Depending on the configuration of the chute 34 with which the vending machine compartment 24 was originally equipped, a landing pad modification kit is, for certain embodiments of the present invention, provided, to reconfigure the chute 34 of the machine compartment 24 to a configuration of landing pad 35 that is preferred in order to adapt the machine compartment 24 to the system 10. This configuration is one which allows the pad 35 to function as a loading element or member that will feed the dispensed product that drops from the trapdoor 33 to the delivery system conveyor. The pad 35 is, in the illustrated embodiment, a concave receiving platform pivotally attached at one end thereof near the front of the chute 34 on a horizontal shaft 36 to pivot from a rest position in which it conforms to the surface of the chute 34 to an activated upright position in which it generally extends vertically upwardly. Preferably, the pad 35 catches the dispensed product 32, which is, for example, a beverage packaged in its own individual plastic bottle, in an inclined, cap-down position, with the top of the product container resting against a stop 37 fixed to the pad 35.

The interface unit 30, in certain embodiments of the invention, has a pair of hinge connectors 37, one at the top and one at the bottom at the hinged side thereof, positioned and configured to connect to the hinges 27 of the cabinet 24. Such connectors 37 may be in the form of a hole at the bottom of the unit 30 and a bracket with a similar hole at the top of the unit 30, to receive an upwardly projecting pin 39 of the hinges 27. At the free side of the unit 30 is provided a locking element 38 that engages the latch 28 of the cabinet 24 to lock the unit 30 in a closed position. The unit 30 has an insulated inner wall 43, which insulates the front opening 21 of the compartment 24 to allow the interior thereof to be maintained under refrigeration. For the storage of beverages such as soft drinks, the interior of the vault 25 is generally maintained at approximately 5° C.

In an alternative configuration, the loading mechanisms 29 from one or a plurality of vending machines are installed in an insulated cabinet or vault to which an interface unit 30 may be attached or of which an interface unit 30 may be a part.

The interface unit 30 preferably includes a loading tube 44 that forms the loading end of the tube of the pneumatic conveyor 26. The loading tube 44 extends vertically to above the unit 30. A slip collar 45 is provided either at the top of the loading tube 44 or on the tube 26 to sealably connect the loading tube 44 to the upstream end of the tube 26. A loading port 42 is provided at the lower end of the loading tube 44. The landing pad 35 forms a gate that, when raised, closes and seals the loading port 42 at the loading or input end of the tube 26. The shaft 37 on which the pad or gate 35 pivots is preferably fixed to the inside of the interface unit 30. A pneumatically or electrically operable gate actuator on the unit 30 is provided to lower the gate 35 to its landing pad position, as illustrated in FIG. 3, or to raise the gate 35 to the port sealing position illustrated in FIG. 2. The raising of the pad or gate 35 requires the lifting of a product 32 into the tube through the port 42. The gate 35 is preferably raised and lowered by double acting electric cylinder 47 in response to signals from the controller of the system 11. Preferably also, the gate is spring biased to its raised position to seal the port 42 if power to the interface were to fail, thereby preventing warming of the interior of the compartment 24.

A blower or air pump 41 is provided in the interface unit 30. The blower has an output connected to the bottom end of the loading tube 44 below the port 42. The blower 41 is sufficiently strong to effectively move a bottled beverage 32, which has been loaded into the loading tube 44 through the port 42, upwardly into and through the tube 26 of the pneumatic conveyor. The interface unit 30 is provided with an electrical connector 53 that connects the control system 55 of the vending machine compartment 24, which includes the logic and drivers needed to operate the trapdoors 33 on the bins 31, with a controller 80 of the pneumatic delivery and dispensing system 11. A sensor such as a limit switch 56 is provided to verify that the landing pad 35 is in the down position when a beverage 32 is dispensed into the chute 34. The controller 80 has inputs and outputs that connect to the dispensing terminals 20 to receive order commands from the input devices 22 and for operation of the terminals 20. The controller 80 also has outputs that connect to diverter valves 81 that direct product moving through the tube 26 to the appropriate dispensing terminal 20 from which an order originated.

The tube 26 usually extends horizontally from the vault 25 but may rise or fall somewhat on the way to the location of the dispensing unit 20. Approaching the dispensing unit 20, the tube 26, in the preferred embodiment, changes to a vertical orientation to enter the dispensing unit 20 either from the bottom or, as shown in the illustrated embodiment, from the top. The discharge end of the tube 26 at the dispensing unit 20 is preferably closed and contains a holding space 60, at least about as long as the product container 40, at which is preferably provided a delivery window 61 in the side of the tube 26, for removal of the dispensed product. Preferably, at the discharge end of the tube 26 at the dispensing unit 20, a pneumatic decelerating device is provided to ease the moving soft drink bottle or other product to a gentle stop. A suitable decelerating device is described in detail in U.S. patent application Ser. No. 08/571,253 that has been incorporated by reference herein.

The operation loading mechanism controller 55 is coordinated and controlled in response to orders placed by customers on the panel 22 and in response to cash payments made or entry of charge account information into the card reader 18, through a beverage delivery system or main controller 80. For example, when a gasoline customer purchases gasoline and inserts a charge card in the card reader 18, a message may be displayed prompting for additional purchase of a beverage if desired by the customer. An order may then be placed by selecting a brand or type of beverage desired by pressing a button on the panel 22. This button selection transmits a beverage order to main controller 80 which preferably controls the conveyor and the loading mechanism controller 55 to cause delivery of the product to the customer. The controller 80 is also part of the communication circuitry that causes the price of the order to be added to the gasoline charge made through the billing system of the gasoline vending system.

When an order has been placed by a customer and accepted by the controller 80, a signal is sent by the controller 80 to the controller 55 of the loading mechanism 50, which causes the controller 55 to activate the appropriate actuator 52 to open the door 33 to drop the selected beverage 32 in its product container 40 into the trough 56. Thereupon, the controller 55 energizes the cylinder 57 to push the dropped container 40 from the trough 56 into the carrier 40. When the controller 80 determines that the container of beverage 32 has been deposited onto the landing pad 35, the pad actuating solenoid 47 is actuated to raise the pad 35 and load the beverage 32, cap end down, into the loading tube 44 through the port 42. Then, when the port 42 is sealed by the pad or gate 35 in its raised position, the blower 41 is energized to blow the beverage 32 in its own container through the tube 26. The controller 80 also actuates the solenoids to move the diverter plates 81 so as to direct the moving beverage 32 from the tube 26 to the dispensing unit 20 at which the order was placed.

Figure 5:
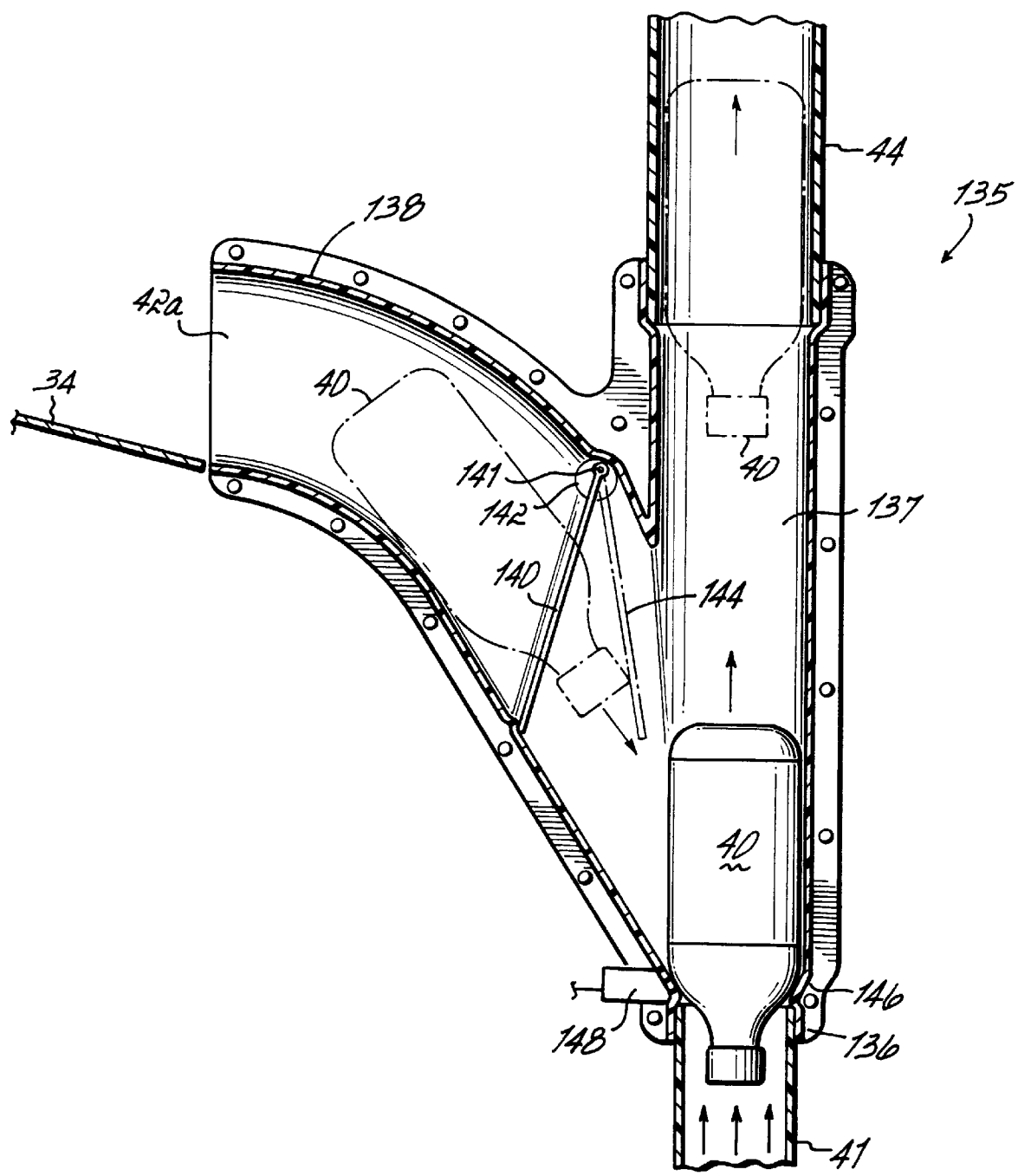
FIG. 5 is a cross-sectional view of an alternative form of the loading portion of FIG. 3.

FIG. 5 illustrates more passive form of landing pad 35 and loading port 42 than illustrated and described above, in the form of a Y-coupling 135 to the loading tube 44. The Y-coupling 135 has a downwardly facing common leg 136 of reduced diameter that connects to the outlet 41. The Y-coupling 135 also has an in-line upwardly facing leg 137 that connects to the inlet end of the loading tube 44 and an upwardly inclined leg 138 positioned to form a lower extension of the discharge chute 32. The inclined leg 138 forms a loading port 42a into which a product 40 in its container loads into the loading tube 44. The port 42a is normally blocked by a valve plate 140 that is pivotally connected at its upper end on a horizontal axis or pivot pin 141 to the wall of the Y-coupling 135. The plate 140 is spring biased to the closed position by a spring element 142 to the closed position in which it is illustrated in FIG. 5. The plate 140 pivots under the force of a falling product 40, as illustrated by the phantom lines 144, to allow the product 40 to fall against and be retained by a frusto-conically shaped collar portion 146 of the lower leg 136 that forms the fitting with the blower outlet 41. With this embodiment, it is not necessary to utilize a sensor or actively driven landing pad to load a product into the loading tube 44. A sensor 148, however, is preferably provided to detect the loading of a product 40 in through the port 42a and to activate the blower 41.

Those skilled in the art will appreciate that there are many uses of the present invention, and that the invention is described herein only in its preferred embodiments. Accordingly, additions and modifications can be made without departing from the principles of the invention.

Therefore, the following is claimed:

1. An interface for adapting a packaged product vending machine for use as a packaged product supply and loading device for selectively supplying packaged products to a pneumatic conveyor of a pneumatic product vending or delivery system, where the vending machine includes a packaged product storage cabinet having an array of product storage positions therein, a dispensing mechanism for selectively dispensing products from the storage positions and control circuitry for receiving control signals for selectively operating the dispensing mechanism, the cabinet having an access opening therein and access panel supporting and latching structure adjacent the opening configured to support an access panel covering and sealing the opening, the interface comprising:

a panel shaped to cover the access opening of the existing vending machine and having supporting and latching elements thereon configured to connect to the supporting and latching structure of the cabinet of the existing vending machine;

a loading tube having a circular cross-section and an internal diameter dimensioned to loosely pass one of the packaged products therethrough, the loading tube having a coupling end that is connectable to the end of a tube of the pneumatic conveyor of the pneumatic product vending or delivery system, the loading tube also having a loading port therein;

a loading member configured to direct a packaged product dispensed by the dispensing mechanism into the loading port of the loading tube; and control lines configured to connect to the control circuitry of the vending machine for interconnecting the vending machine controls to a controller of the a pneumatic product vending or delivery system.

2. The interface of claim 1 where the vending machine includes a thermally insulated storage cabinet, and wherein:

the panel is a thermally insulated panel shaped to cover and thermally seal the access opening.

3. The interface of claim 2 wherein the loading tube has an air intake located outside of the cabinet when the panel is covering the opening.

4. The interface of claim 1 wherein the packaged products are individually bottled beverages and the loading element is configured to direct a bottled beverage dispensed by the dispensing mechanism into the loading port of the loading tube.

5. The interface of claim 1 wherein the packaged products are individually bottled beverages and the loading element is configured to direct a bottled beverage dispensed by the dispensing mechanism into the loading port of the loading tube, and wherein:

the panel has a thermally insulated inner wall located between the loading tube and the access opening and shaped to seal and insulate the access opening, the wall having a passage therethrough;

the loading tube is vertically oriented with the coupling end at the top thereof and the loading port accessible through the passage in the wall, the loading tube having an air inlet at the bottom thereof having an air pump connected thereto;

the loading member is in the form of a pivoting gate positionable to alternately direct the bottled beverage through the passage and to close the loading port of the loading tube.

6. A product delivery system suitable for dispensing bottled beverages comprising:

a pneumatic product vending or delivery system including a product dispensing terminal, a delivery system control including a product selector located in the dispensing terminal, and a pneumatic conveyor having a delivery tube with an output end connected to the dispensing terminal;

a storage cabinet having a packaged product vending machine dispensing mechanism and storage array of storage positions therein, the dispensing mechanism being operable to selectively dispense products from the storage positions, the mechanism having control lines for receiving signals for operating the dispensing mechanism;

an interface adapting the existing vending machine dispensing mechanism to function as a supply and loading device for the vending and delivery system and which includes:

a loading tube having a circular cross-section and an internal diameter dimensioned to loosely pass one of the products therethrough, the loading tube having a coupling end connected to the end of the tube of the pneumatic conveyor and having loading port therein;

a loading element configured to direct a product dispensed by the dispensing mechanism into the loading port of the loading tube; and control lines connected between the control circuitry and the vending or delivery system control.

7. The system of claim 6 where the vending machine includes a thermally insulated storage cabinet, and wherein:

the storage cabinet is a storage cabinet of the existing package product vending machine and has an access opening therein with access panel supporting and latching structure adjacent thereto configured for closing and sealing by a vending machine door; and the interface includes an insulated wall having the shape of the vending machine door and having supporting and latching elements thereon connected to the supporting and latching structure of the cabinet to thereby support the interface on the cabinet.

8. The system of claim 7 where the vending machine includes a thermally insulated storage cabinet, and wherein:

the panel is a thermally insulated panel shaped to cover and thermally seal the access opening.

9. The system of claim 7 wherein the packaged products are individually bottled beverages and the loading element is configured to direct a bottled beverage dispensed by the dispensing mechanism into the loading port of the loading tube, and wherein:

the panel has a thermally insulated inner wall located between the loading tube and the access opening and shaped to seal and insulate the access opening, the wall having a passage therethrough;

the loading tube is vertically oriented with the coupling end at the top thereof and the loading port accessible through the passage in the wall, the loading tube having an air inlet at the bottom thereof having an air pump connected thereto;

the loading member is in the form of a pivoting gate positionable to alternately direct the bottled beverage through the passage and to close the loading port of the loading tube.

10. The system of claim 6 wherein the packaged products are individually bottled beverages and the loading element is configured to direct a bottled beverage dispensed by the dispensing mechanism into the loading port of the loading tube.

11. The system of claim 6 wherein the loading tube has an air intake located outside of the cabinet when the panel is covering the opening.

12. A method of adapting an existing vending machine to serve as a supply and loading device for a pneumatic product vending or delivery system, wherein the vending machine includes a storage cabinet having an array of product storage positions therein, a dispensing mechanism for selectively dispensing products from the storage positions and control circuitry for receiving signals for operating the dispensing mechanism, the cabinet having an opening therein with panel supporting and latching structure adjacent the opening configured to support a panel to cover and seal the opening, and wherein the pneumatic product vending or delivery system includes a product dispensing terminal, a delivery system control including a product selector located in the dispensing terminal, and a pneumatic conveyor having a delivery tube with an output end connected to the dispensing terminal, and a controller for operating the conveyor and generating a product selection signal in response to information entered by a customer, the method comprising the steps of:

providing an interface unit including a panel wall in the shape of an access panel for the existing vending machine, the interface unit having supporting and latching elements thereon, a loading tube having a cross-section shaped and dimensioned to loosely pass one of products therethrough and a coupling end, a loading element positioned to direct a product dispensed by the dispensing mechanism into the loading port of the loading tube; and control lines connectable to the control circuitry of the vending machine and connected to the controller of the pneumatic product vending or delivery system; and in place of the vending machine access panel, installing the interface unit on the cabinet by connecting the supporting and latching elements of the unit to the supporting and latching structure of the cabinet, connecting the coupling end of the loading tube to the tube of the conveyor and connecting the control lines of the unit to the control circuitry of the vending machine.

13. The method of claim 12 where the vending machine includes a thermally insulated storage cabinet and wherein:

the providing step includes the step of providing the interface unit with a thermally insulated panel wall.

14. The method of claim 13 wherein:

the providing step further includes the step of providing the interface with the loading tube having an air intake located outside of the cabinet when the panel is covering the opening.

15. The method of claim 12 where the packaged products are individually bottled beverages and wherein:

the providing step includes the step of providing the interface unit with the loading element configured to direct a bottled beverage dispensed by the dispensing mechanism into the loading port of the loading tube.

16. The method of claim 12 where the packaged products are individually bottled beverages and wherein:

the providing step includes the steps of providing the interface unit with a panel having a thermally insulated inner wall located between the loading tube and the access opening and shaped to seal and insulate the access opening, the wall having a passage therethrough, with the loading tube vertically oriented with the coupling end at the top thereof and the loading port accessible through the passage in the wall and having an air inlet at the bottom thereof having an air pump connected thereto, and with the loading member in the form of a pivoting gate positionable to alternately direct the bottled beverage through the passage and to close the loading port of the loading tube.

17. A method of adapting the product dispensing portion of an existing vending machine to serve as a supply and loading device for a pneumatic product vending or delivery system, wherein the vending machine includes a storage and dispensing mechanism having an array of product storage positions with the dispensing mechanism being operable to selectively dispense products from the storage positions, and having control circuitry for receiving signals for operating the dispensing mechanism, and wherein the pneumatic product vending or delivery system includes a product dispensing terminal, a delivery system control including a product selector located in the dispensing terminal, and a pneumatic conveyor having a delivery tube with an output end connected to the dispensing terminal, and a controller for operating the conveyor and generating a product selection signal in response to information entered by a customer, the method comprising the steps of:

providing a storage vault and locating at least one dispensing mechanism from an existing vending machine therein, providing a loading tube having a cross-section shaped and dimensioned to loosely pass one of products therethrough and a coupling end, providing a loading element positioned to direct a product dispensed by the dispensing mechanism into the loading port of the loading tube, and providing control lines connectable to the control circuitry of the vending machine dispensing mechanism and connected to the controller of the a pneumatic product vending or delivery system.

18. The method of claim 17 further comprising the step of:

providing an air intake located outside of the vault and connected to the loading tube.

19. The method of claim 17 where the packaged products are individually bottled beverages and wherein:

the providing step includes the step of providing a loading element configured to direct a bottled beverage dispensed by the dispensing mechanism into the loading port of the loading tube.

* * * * *